United States Patent
Lu et al.

(10) Patent No.: US 12,184,363 B2
(45) Date of Patent: Dec. 31, 2024

(54) METHODS, DISTRIBUTED BASE STATION SYSTEM, REMOTE RADIO UNIT AND BASE BAND UNIT SYSTEM FOR HANDLING DOWNLINK SIGNALS

(71) Applicant: Telefonaktiebolaget LM Ericsson (publ), Stockholm (SE)

(72) Inventors: Chenguang Lu, Sollentuna (SE); Yezi Huang, Täby (SE); Miguel Berg, Sollentuna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 423 days.

(21) Appl. No.: 17/620,292

(22) PCT Filed: Jun. 20, 2019

(86) PCT No.: PCT/SE2019/050600
§ 371 (c)(1),
(2) Date: Dec. 17, 2021

(87) PCT Pub. No.: WO2020/256609
PCT Pub. Date: Dec. 24, 2020

(65) Prior Publication Data
US 2022/0255596 A1 Aug. 11, 2022

(51) Int. Cl.
H04B 7/0456 (2017.01)
H04W 72/044 (2023.01)
(Continued)

(52) U.S. Cl.
CPC ........ *H04B 7/0456* (2013.01); *H04W 72/046* (2013.01); *H04W 72/541* (2023.01); *H04W 88/085* (2013.01)

(58) Field of Classification Search
CPC . H04B 7/0456; H04B 7/0413; H04W 72/046; H04W 72/541; H04W 88/085
See application file for complete search history.

(56) References Cited

U.S. PATENT DOCUMENTS

| | | | |
|---|---|---|---|
| 8,838,051 B1* | 9/2014 | Su | H04B 7/0465 375/267 |
| 2015/0124688 A1* | 5/2015 | Xu | H04B 7/0452 370/312 |

(Continued)

FOREIGN PATENT DOCUMENTS

| | | |
|---|---|---|
| WO | 2016115546 A1 | 7/2016 |
| WO | 2018091089 A1 | 5/2018 |

(Continued)

OTHER PUBLICATIONS

Park, "Joint Design of Fronthaul and Access Links for C-RAN With Wireless Fronthauling", IEEE Signal Processing Letters, vol. 23, No. 11, Nov. 2016 (Year: 2016).*

(Continued)

*Primary Examiner* — Peter P Chau
*Assistant Examiner* — Mang Boi Thawng
(74) *Attorney, Agent, or Firm* — COATS & BENNETT, PLLC

(57) ABSTRACT

Disclosed is a method performed by a BBU system of a wireless communication network, comprising a distributed base station system (100), which comprises a BBU (110) and an RRU (120) connected over a fronthaul link (140). The method comprises determining first and second parts of beamforming weights based on a determined downlink channel estimate, and compressing the second part of the beamforming weights. The first part of the beamforming weights is determined for performing interference cancellation between user-layer signals, and the second part is determined for expanding the user-layer signals to antenna signals. The BBU then sends the first part and the compressed second part of the beamforming weights to the RRU, as well as the user-layer signals, over the fronthaul link (140). The RRU (120) then beamforms the user-layer signals according to the first and the second parts of the beamform- (Continued)

ing weights before sending the signals to a number of UEs (131, 132, 133).

20 Claims, 7 Drawing Sheets

(51) Int. Cl.
*H04W 72/541* (2023.01)
*H04W 88/08* (2009.01)

(56) References Cited

U.S. PATENT DOCUMENTS

| | | | |
|---|---|---|---|
| 2015/0358057 A1* | 12/2015 | Lindqvist | H04B 7/0626 |
| | | | 370/329 |
| 2016/0211893 A1 | 7/2016 | Kim et al. | |
| 2018/0138957 A1* | 5/2018 | Wang | H04W 88/085 |
| 2020/0052752 A1* | 2/2020 | Nammi | H04B 7/0639 |
| 2021/0111930 A1* | 4/2021 | Davydov | H04L 5/0048 |
| 2021/0119674 A1* | 4/2021 | Yuan | H04B 7/0456 |

FOREIGN PATENT DOCUMENTS

| | | |
|---|---|---|
| WO | 2018164614 A1 | 9/2018 |
| WO | 2019098897 A1 | 5/2019 |
| WO | 2019132743 A1 | 7/2019 |
| WO | 2020256609 A1 | 12/2020 |

OTHER PUBLICATIONS

O-RAN Fronthaul Working Group, "Control, User and Synchronization Plane Specification", O-RAN.WG4.CUS.0-v05.00, Nov. 2020, pp. 1-291.
Zhou, Y. et al., "Flexible Functional Split Design for Downlink C-RAN With Capacity-Constrained Fronthaul", IEEE Transactions on Vehicular Technology, Jun. 2019, pp. 6050-6063, vol. 68, No. 6.
XRAN-FH CUS 0-v01-00 XRAN Fronthaul Working Group, "Control, User and Synchronization Plane Specification", XRAN-FH.CUS.0-v01.00 Technical Specification, Apr. 2018, pp. 1-61.
3rd Generation Partnership Project, "Technical Specification Group Radio Access Network; Study on new radio access technology: Radio access architecture and interfaces (Release 14)", 3GPP TR 38.801 V14.0.0, Mar. 2017, pp. 1-91.

* cited by examiner

METHODS, DISTRIBUTED BASE STATION SYSTEM, REMOTE RADIO UNIT AND BASE BAND UNIT SYSTEM FOR HANDLING DOWNLINK SIGNALS

TECHNICAL FIELD

The present disclosure relates generally to methods, remote radio units, and base band unit systems of distributed base stations, as well as distributed base station systems for handling downlink signals. More specifically, the present disclosure deals with such methods, units and systems when the remote radio unit has a plurality of antennas for sending downlink signals, such as in Multiple Input Multiple Output (MIMO) systems. The present disclosure further relates to computer programs and carriers corresponding to the above methods, units and systems.

BACKGROUND

In a centralized radio access network (C-RAN), also called a distributed base station system, radio access network (RAN), processing is conducted by two separate units: a remote radio unit (RRU), and a base band unit (BBU). The BBU is connected to the RRU via a fronthaul link. The RRU may also be called Radio Unit (RU) and the base band unit may also be called base unit (BU). The RRU is connected to one or more antennas through which the RRU wirelessly communicates with at least one user equipment (UE). The BBU is in its turn connected to other base station systems or base stations, and to a core network of a wireless communication system. The BBU is centralized and there may be more than one RRU connected to each BBU. Traditionally, the BBU performs advanced radio coordination features such as joint detection, joint decoding, coordinated multi-point transmission (CoMP), to increase the spectrum efficiency and network capacity, as well as baseband processing, whereas the RRUs perform radio frequency (RF) processing and transmission/reception of the RF processed signals. Such a split of base station functionality between BBU and RRU is called a physical layer-radio frequency (PHY-RF) split.

Originally, the RRU was designed to reduce the cable loss of the coax cables between an antenna tower top where the actual antennas are situated and the bottom of the antenna tower where the base station functionality is hosted. Therefore, before 5$^{th}$ Generation of mobile communication (5G), i.e. at 4G, e.g. Long Term Evolution (LTE), the RRU was rather simple and was mainly doing RF processing with limited baseband processing, if any.

When going from 4G to 5G, there is a need to increase the wireless communication capacity towards the UEs in order to be able to deliver requested data amounts per time period in 5G. One enabler of the mobile evolution towards 5G is massive Multiple Input Multiple Output (MIMO) in which each RRU has a plurality of antennas. In other words, massive MIMO exploits spatial multiplexing to improve spectrum efficiency by using antenna arrays at the RRU, which antenna array is equipped with N antennas simultaneously serving K user-layers in the same time-frequency resource. The typical scenario is N>>K. e.g., N is 64, 128 or 256 while K is 8 or 16. As shown, the number of antennas are quite large. Massive MIMO is often referred to as massive beamforming, which is able to form narrow beams and focus on different directions. It also benefits multi-user MIMO, which allows the transmissions to multiple UEs simultaneously over separate spatial channels resolved by the massive MIMO technologies, while keeping high capacity for each UE. To support such massive MIMO solutions, the required fronthaul link capacity needs to increase in proportion to the increase of number of antennas, when using the current PHY-RF split between functionality of BBU and RRU. This will dramatically drive up the fronthaul link costs.

To reduce the required fronthaul (FH) capacity, new functional splits within the physical layer (PHY) are discussed and proposed. Basically, some baseband PHY functions will be moved to the RRU, which mainly performs RF-related operations in the current Common Public Radio Interface (CPRI) based implementation. Two options for intra-PHY split have attracted attention.

Option 1: transport frequency-domain samples in FH, instead of transporting time-domain samples in CPRI. In this option, RRU needs to perform FFT/IFFT operations to transform between time domain and frequency domain samples. Here, option 1 is referred to as frequency domain FH (fdFH). In fdFH, the number of FH streams still equals to the number of antennas. One advantage of fdFH is the possibility that fdFH traffic is proportional to the air interface traffic load. The required peak capacity is still high when traffic is fully loaded.

Option 2: transport layer samples in FH. It means the MIMO or beamforming processing is done in the RRU. The number of FH streams are reduced to the number layers. For example, if the system is N=64 antennas and K=16 user layers, there are only 16 FH streams going through the FH link. Here option 2 is referred to as layer FH (laFH). This can dramatically reduce the required FH capacity, which is also proportional to traffic load. However, moving the whole MIMO or beamforming processing to RRU may increase significantly the complexity of RRU, especially when the beamforming weights are calculated in RRU.

For laFH, to reduce the RRU complexity in the DL, one implementation option is to perform channel estimation and beamforming weights calculation in the BBU, send the calculated beamforming weights to the RRU and then the RRU performs beamforming using the received beamforming weights. Such an approach is in line with the functional split option 7-1 and 7-2 described in 3GPP TR 38.801, "Study on new radio access technology: Radio access architecture and interfaces", V14.0.0, March 2017. It is also adopted in xRAN spec in "xRAN Fronthaul Working Group, Control, User and Synchronization Plane Specification" TS XRAN-FH.CUS.0-v02.01, November 2018, which has been merge into O-RAN spec in "O-RAN Fronthaul Control, User and Synchronization Plane Specification Version 1.0-March, 2019". For example, for Category B RRU defined in O-RAN, the DL beamforming/precoding function is performed in RRU. Note that the beamforming term used in this document is also referred to as digital beamforming and precoding. Basically, the beamforming essentially forms different beam patterns for different user-layer signals with different sets of beamforming weights. For consistency with a short expression, beamforming is used in the rest of the document. For the functional split with Category B RRU defined in O-RAN, IFFT, CP addition, beamforming functions reside in the RRU, while the rest of the PHY functions including resource-element mapping, layer mapping, modulation, etc., reside in the BBU.

The above examples in the DL scale the FH traffic based on streams or layers proportional to user traffic, which allows using higher number of antennas without significantly increasing FH data traffic while minimizing the RRU complexity. This benefit is enabled by allocating beamforming capability in RRU and keeping channel estimation and beamforming calculations in BBU.

Further, certain wireless communication networks, such as Time Division Duplex (TDD)-based networks, e.g. TD-LTE and NR running on TDD spectrum, have a reciprocity aided transmission (RAT). It assumes reciprocity of the downlink (DL) and uplink (UL) channel. As reciprocity is assumed, the base station can utilize the UL reference signals to estimate the DL channel. The base station then uses the DL channel estimation to perform DL beamforming. Such an approach performs better than a codebook-based approaches when channel estimation is accurate, e.g. when Signal to Interference and Noise Ratio (SINR) is high. For RAT in O-RAN as one example, the UL channel estimation is done in BBU. Then the BBU calculates the DL beamforming weights (BFWs), which is also referred to as beam weights in literature, based on the UL channel estimate and sends them to the RRU via the FH interface. Due to a large computational complexity involved in calculating the BFWs (e.g., matrix inversion), this would dramatically decrease the complexity of the RRU by performing the BFW calculation in BBU instead of in the RRU. Further, if a $3^{rd}$ party RRU is used, it is also good that the BBU keeps the capability to control beamforming algorithms, one of the most valuable core baseband functions. Therefore, this disclosure focuses on this scenario in which the RRU receives the BFWs from the BBU, which may include N×K complex numbers per group of subcarriers, e.g., per resource block (RB) or multiple RBs, where N denotes the number of antennas at the base station and K denotes the number of user layers. However, the BFWs can cause a high-volume FH traffic burst, which can significantly increase the required FH capacity in the DL direction.

In international patent application WO 2019/098897 of the present applicant, an idea of performing beamforming at the RRU, determining some BFWs at the BBU and some BFWs at the RRU, and transporting the BFWs determined by the BBU to the RRU, was introduced in the downlink direction. The BFWs determined at the BBU are the ones that require the highest computational complexity. This method effectively reduces the RRU complexity for calculating BFWs and reduces the required FH capacity for sending BFWs from the BBU to the RRU. However, the method requires the RRU to perform channel estimation and determine partial beamforming weights, which may not be compliant to O-RAN architecture where the channel estimation is only done in the BBU. Consequently, there is a need for a solution in which the FH capacity can be kept on a reasonable level, the RRU complexity can be on a rather low level and that still is compliant to O-RAN architecture.

SUMMARY

It is an object of the invention to address at least some of the problems and issues outlined above. It is possible to achieve these objects and others by using methods, network nodes and wireless communication devices as defined in the attached independent claims.

According to one aspect, a method is provided performed by a distributed base station system of a wireless communication network. The distributed base station system comprises a BBU and an RRU connected to each other over a fronthaul link. The RRU is connected to N antennas. The method comprises determining, by the BBU, a second part of beamforming weights, based on a determined downlink channel estimate, compressing, by the BBU, the second part of the beamforming weights, and determining, by the BBU, a first part of the beamforming weights based on the determined downlink channel estimate. The first and second part of the beamforming weights are to be used for beamforming K user-layer downlink signals to be sent to a number of UEs wirelessly connected to the RRU. The method further comprises sending, by the BBU, the first part of the beamforming weights and the compressed second part of the beamforming weights to the RRU, and sending, by the BBU, the K user-layer signals to the RRU. The method further comprises, by the RRU, decompressing the received compressed second part of the beamforming weights, beamforming the received K user-layer signals into N antenna signals, using the first part and the decompressed second part of the beamforming weights, and sending the beamformed N antenna signals to the number of UEs via the N antennas. Further, the first part of the beamforming weights are determined for performing interference mitigation between the user-layer signals in the beamforming, and the second part of the beamforming weights are determined for expanding the user-layer signals to antenna signals in the beamforming.

According to another aspect, a method is provided performed by a BBU system of a wireless communication network. The wireless communication network comprises a distributed base station system comprising a BBU and an RRU connected to the BBU over a fronthaul link. The RRU is connected to N antennas. The method comprises determining a second part of beamforming weights based on a determined downlink channel estimate, compressing the second part of the beamforming weights, and determining a first part of the beamforming weights based on the determined downlink channel estimate. The first and second part of the beamforming weights are to be used for beamforming K user-layer downlink signals to be sent to a number of UEs wirelessly connected to the RRU. The method further comprises triggering sending of the first part of the beamforming weights and the compressed second part of the beamforming weights to the RRU, and triggering sending of the K user-layer signals to the RRU. Further, the first part of the beamforming weights are determined for performing interference cancellation between the user-layer signals, and the second part of the beamforming weights are determined for expanding the user-layer signals to antenna signals.

According to another aspect, a method is described performed by an RRU of a distributed base station system. The RRU is connected to N antennas. The distributed base station system further comprises a BBU connected to the RRU over a fronthaul link. The method comprises receiving, from the BBU, K user-layer downlink signals to be sent to a number of UEs wirelessly connected to the RRU, and receiving, from the BBU, a first part of beamforming weights and a compressed second part of beamforming weights for beamforming the K user-layer signals, the first and the second part of the beamforming weights being determined by the BBU from a downlink channel estimate. The method further comprises decompressing the compressed second part of the beamforming weights, beamforming the received K user-layer signals into antenna signals, using the first part and the decompressed second part of the beamforming weights, and sending the antenna signals to the number of UEs via the N antennas. Further, the user-layer signals are beamformed so that the first part of the beamforming weights are adapted for interference cancellation between the user-layer signals, and the second part of the beamforming weights are adapted for expanding the user-layer signals to antenna signals.

According to another aspect, a distributed base station system is provided operable in a wireless communication network. The distributed base station system comprises a BBU and an RRU connected to each other over a fronthaul link. The RRU is connected to N antennas. The distributed base station system comprises a processing circuitry and a memory, said memory containing instructions executable by said processing circuitry, whereby the distributed base station system is operative for determining, by the BBU, a second part of beamforming weights based on a determined downlink channel estimate and compressing, by the BBU, the second part of the beamforming weights. The distributed base station system is further operative for determining, by the BBU, a first part of the beamforming weights based on the determined downlink channel estimate. The first and the second part of the beamforming weights are to be used for beamforming K user-layer downlink signals to be sent to a number of UEs wirelessly connected to the RRU. The distributed base station system is further operative for sending, by the BBU, the first part of the beamforming weights and the compressed second part of the beamforming weights to the RRU, and sending, by the BBU, the K user-layer signals to the RRU. The distributed base station system is further operative for decompressing, by the RRU, the received compressed second part of the beamforming weights, beamforming, by the RRU, the received K user-layer signals into N antenna signals, using the first part and the decompressed second part of the beamforming weights and sending, by the RRU, the beamformed N antenna signals to the number of UEs via the N antennas. Further, the first part of the beamforming weights are determined for performing interference mitigation between the user-layer signals in the beamforming, and the second part of the beamforming weights are determined for expanding the user-layer signals to antenna signals in the beamforming.

According to another aspect, a BBU system is provided operable in a wireless communication network. The wireless communication network comprises a distributed base station system having a BBU and an RRU connected to the BBU over a fronthaul link. The RRU further has N antennas. The BBU system comprises a processing circuitry and a memory. Said memory contains instructions executable by said processing circuitry, whereby the BBU system is operative for determining a second part of beamforming weights based on a determined downlink channel estimate, compressing the second part of the beamforming weights, and determining a first part of the beamforming weights based on the determined downlink channel estimate. The first and the second part of the beamforming weights are to be used for beamforming K user-layer downlink signals to be sent to a number of UEs wirelessly connected to the RRU. The BBU system is further operative for triggering sending the first part of the beamforming weights and the compressed second part of the beamforming weights to the RRU, and triggering sending the K user-layer signals to the RRU. Further, the first part of the beamforming weights are determined for performing interference cancellation between the user-layer signals, and the second part of the beamforming weights are determined for expanding the user-layer signals to antenna signals.

According to another aspect, an RRU is provided operable in a distributed base station system of a wireless communication network. The distributed base station system further comprises a BBU connected to the RRU over a fronthaul link. The RRU is operable to be connected to N antennas. The RRU comprises a processing circuitry and a memory. Said memory contains instructions executable by said processing circuitry, whereby the RRU is operative for receiving, from the BBU, K user-layer downlink signals to be sent to a number of UEs wirelessly connected to the RRU, and receiving, from the BBU, a first part of beamforming weights and a compressed second part of beamforming weights for beamforming the K user-layer signals, the first and the second part of the beamforming weights being determined by the BBU from a downlink channel estimate. The RRU is further operative for decompressing the compressed second part of the beamforming weights, beamforming the received K user-layer signals into antenna signals, using the first part and the decompressed second part of the beamforming weights, and sending the antenna signals to the number of UEs via the N antennas. The user-layer signals are beamformed so that the first part of the beamforming weights are adapted for interference cancellation between the user-layer signals, and the second part of the beamforming weights are adapted for expanding the user-layer signals to antenna signals.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Embodiments of the present invention aims to achieve a more efficient split of RAN processing functionality between the RRU and the BBU when it comes to RRU complexity and required fronthaul capacity when the RRU has a plurality of antennas. Therefore, it is suggested to decompose the determination of beamforming weights (BFW) into two parts, where the first part of the beamforming weights are determined for performing interference mitigation between the user-layer signals in the beamforming, and the second part of the beamforming weights are determined for expanding the user-layer signals to antenna signals in the beamforming. The BFWs are determined by the BBU and sent over the FH to the RRU, which makes the actual beamforming. Based on the understanding that beamforming for interference mitigation is rather sensitive to the accuracy of the beamforming weights whereas beamforming for expanding user-layer signals to antenna signals is comparatively robust, the inventors have come to the conclusion that the second beamforming weights can be more compressed before they are sent to the RRU. Hereby, fronthaul capacity is saved without losing any noticeable accuracy of the beamformed signal.

Figure 1:
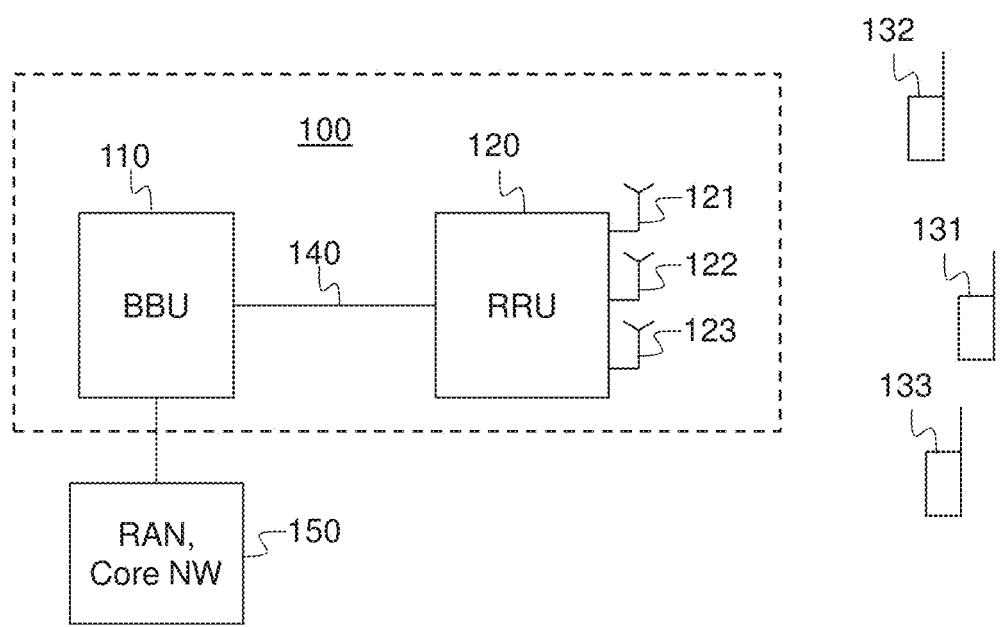
FIG. 1 is a block diagram illustrating a wireless communication network in which the present invention may be used.

FIG. 1 illustrates a wireless communication network in which the present invention may be used. The wireless communication network comprises a distributed base station system 100, which in turn comprises a BBU 110 and a RRU 120. The BBU 110 has connections to other base station nodes or other RAN nodes and further to a core network (symbolized with 150 in FIG. 2) so that the distributed base station system can communicate to other nodes of the communication network. The BBU is connected with the RRU via a fronthaul link 140. The fronthaul link 140 may be any kind of connection, such as a dedicated wireline or wireless connection or a connection via a network, as long as the connection fulfils fronthaul requirements, e.g. in capacity and latency. The RRU further has a plurality of antennas 121, 122, 123 through which wireless signals are communicated towards and from one or more UEs 131, 132, 133. The wireless signals comprises data to be communicated from or to the UEs 131, 132, 133. The BBU 110 and the RRU 120 comprise RAN functionality for handling the data and signals to be communicated between the RRU 120 and the UEs 131, 132, 133. The RAN functionality is distributed between the BBU and the RRU as will be described further down in this disclosure. It can be noted that in 3GPP, the BBU can be further split to two units called DU (Distributed Unit) and CU (Central Unit), where DU corresponds to the lower layer processing (e.g. L1 and L2) of the BBU and CU corresponds to the higher layer processing of the BBU (e.g. L3 and higher).

The wireless communication network in which the distributed base station 100 is to be used may be any kind of wireless communication network that can provide radio access to wireless communication devices. Examples of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as fifth generation wireless communication networks based on technology such as New Radio (NR).

The UEs 131, 132, 133 may be any type of communication device capable of wirelessly communicating with the RRU 120 using radio signals. For example, the UEs may be a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Figure 2:
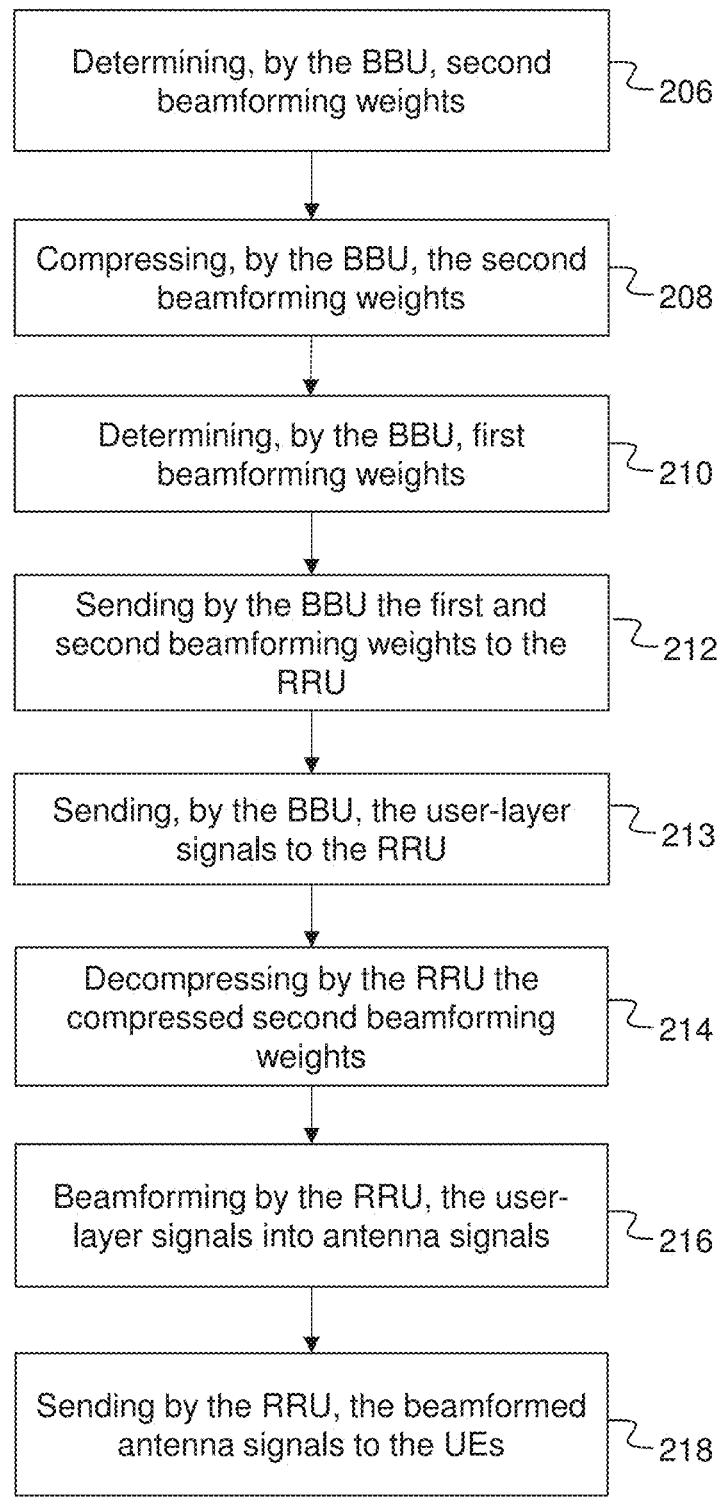
FIG. 2 is a flow chart illustrating a method performed by a distributed base station system, according to possible embodiments.

FIG. 2, in conjunction with FIG. 1, describes a method performed by a distributed base station system 100 of a wireless communication network. The distributed base station system 100 comprises a BBU 110 and a RRU 120 connected to each other over a fronthaul link 140. The RRU 120 is connected to N antennas 121, 122, 123. The method comprises determining 206, by the BBU, a second part of beamforming weights, based on a determined downlink channel estimate, compressing 208, by the BBU, the second part of the beamforming weights, and determining 210, by the BBU, a first part of the beamforming weights based on the determined downlink channel estimate, wherein the first and second part of the beamforming weights are to be used for beamforming K user-layer downlink signals to be sent to a number of UEs 131, 132, 133 wirelessly connected to the RRU 120. The method further comprises sending 212, by the BBU, the first part of the beamforming weights and the compressed second part of the beamforming weights to the RRU, and sending 213, by the BBU, the K user-layer signals to the RRU. The method further comprises, by the RRU, decompressing 214 the received compressed second part of the beamforming weights, beamforming 216 the received K user-layer signals into N antenna signals, using the first part and the decompressed second part of the beamforming weights, and sending 218 the beamformed N antenna signals to the number of UEs via the N antennas 121, 122, 123. Further, the first part of the beamforming weights are determined 210 for performing interference mitigation between the user-layer signals in the beamforming 216, and the second part of the beamforming weights are determined 208 for expanding the user-layer signals to antenna signals in the beamforming 216.

The beamforming weights are used for beamforming the K user-layer signals into antenna signals to be sent from the antennas of the RRU towards the UEs. Beamforming weights may also be called pre-coding coefficients, and the beamforming 216 may also be called pre-coding. "Compressing the second part of beamforming weights" means reducing the number of bits with which the second part of beamforming weights are represented.

By determining the beamforming weights in the BBU instead of at the RRU, complexity at the RRU can be saved. In other words, the rather computational-heavy determining of beamforming weights are made at the BBU instead of at the RRU, and therefore the RRU can be made more cost-efficient than if it would have determined the beamforming weights. Also, it is not compliant to the O-RAN architecture to do channel estimation at the RRU, for determination of the beamforming weights. To send the beamforming weights and the K user-layer signals over the fronthaul link requires less fronthaul link capacity than sending the beamformed antenna signals over the link. Further, it may be a problem with fronthaul capacity to send a lot of beamforming weights in a short time, as the beamforming weights needs to arrive in time for doing the beamforming in RRU. Therefore, it is an interest to reduce the required fronthaul capacity for sending the beamforming weights. As claimed, the first part of the beamforming weights are determined 210 for performing interference mitigation/cancellation between the user-layer signals in the beamforming 216, and the second part of the beamforming weights are determined 208 for expanding the user-layer signals to antenna signals in the beamforming 216. Beamforming for interference mitigation has proven to be rather sensitive to the accuracy of the beamforming weights whereas beamforming for expanding user-layer signals to antenna signals is comparatively robust. In other words, the second part of beamforming weights are less sensitive to the errors e.g. due to lossy compression compared to the first part of beamforming weights. Based on this understanding, the inventors have come to the conclusion that the second beamforming weights can be more compressed before they are sent to the RRU in order to save fronthaul capacity and without losing any noticeable accuracy of the beamformed signal. Hereby the required fronthaul capacity is reduced without any significant performance loss.

Figure 3:
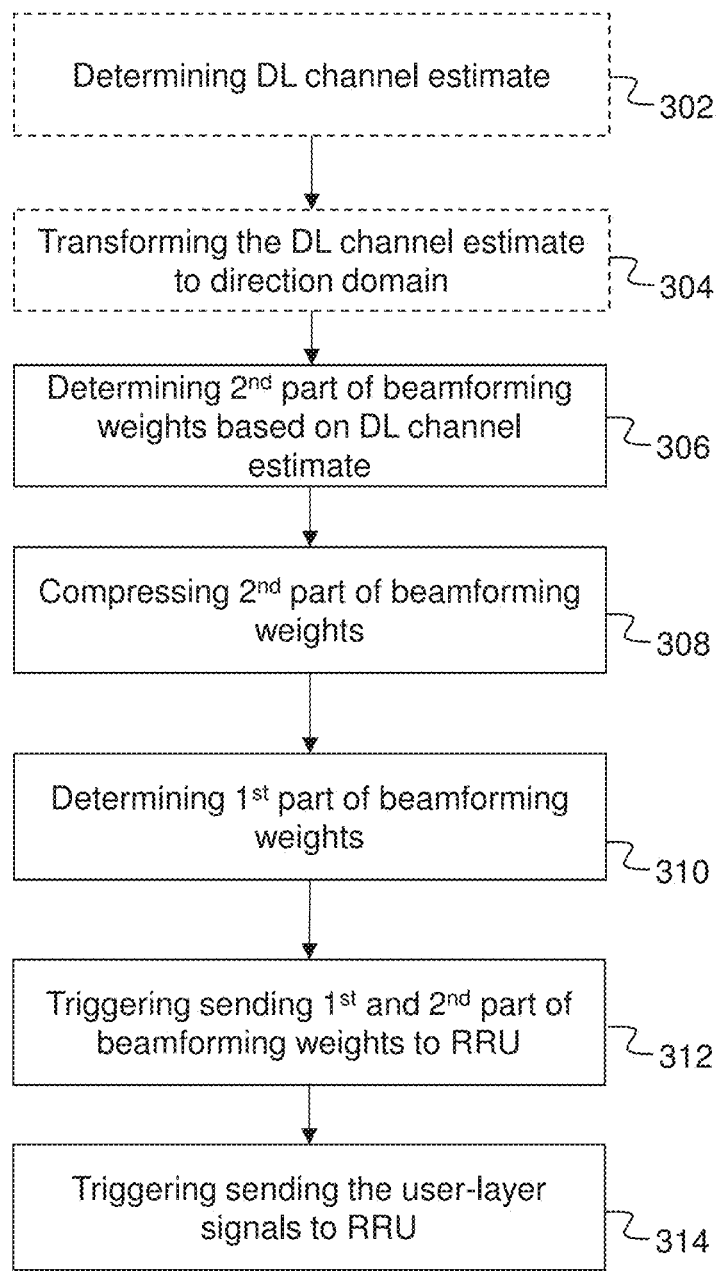
FIG. 3 is a flow chart illustrating a method performed by a BBU system, according to possible embodiments.

FIG. 3 in conjunction with FIG. 1, describes a method performed by a BBU system of a wireless communication network. The wireless communication network comprises a distributed base station system 100 comprising a BBU 110 and an RRU 120 connected to the BBU 110 over a fronthaul link 140. The RRU 120 is connected to N antennas 121, 122, 123. The method comprises determining 306 a second part of beamforming weights based on a determined downlink channel estimate, compressing 308 the second part of the beamforming weights, and determining 310 a first part of the beamforming weights based on the determined downlink channel estimate. The first and second part of the beamforming weights are to be used for beamforming K user-layer downlink signals to be sent to a number of UEs 131, 132, 133 wirelessly connected to the RRU 120. The method further comprises triggering sending 312 of the first part of the beamforming weights and the compressed second part of the beamforming weights to the RRU, and triggering sending 314 of the K user-layer signals to the RRU. Further, the first part of the beamforming weights are determined 310 for performing interference cancellation between the user-layer signals, and the second part of the beamforming weights are determined 306 for expanding the user-layer signals to antenna signals.

The BBU system of the wireless communication network that performs the method may be the BBU 110. Alternatively, the BBU system that performs the method may be arranged in or at any other network node of the communication network, such as a node further away from the UE, e.g. another network element in the RAN or close to the RAN or another RAN node. In this alternative, and the embodiment below, the BBU 110 receives from the RRU 120, uplink signals that the RRU has received from the UEs, or information related to those uplink signals, and communicates the uplink signals/information to the other network node that determines the downlink channel estimate, and from the downlink channel estimate determines the first and second part of the beamforming weights. The other network node then sends the determined first and second part of the beamforming weights back to the BBU 110 for further distribution to the RRU 120. Alternatively, the system of the wireless communication network that performs the method may be a group of network nodes, wherein functionality for performing the method are spread out over different physical, or virtual, nodes of the network. The latter may be called a "cloud-solution".

According to an embodiment, the method further comprises determining 302 the downlink channel estimate on received uplink signals, originating from the number of UEs 131, 132, 133. For wireless communication networks based on technology that is reciprocal in the air, such as TDD-based technologies, the downlink channel estimate can be determined rather accurate from uplink signals. When channel estimation is accurate, e.g. when SINR is high, such an approach performs even better than a codebook-based approach. In TDD for example, any difference between uplink and downlink channel is mainly from the radio frontend difference in uplink and downlink, which difference can be calibrated out. The uplink signals may be reference signals originating from the number of UEs. The reference signals may be the same reference signals from the UEs or different signals. They may be sent simultaneously or at different times.

According to another embodiment, the second part of the beamforming weights are compressed 308 by selecting only a subset of the determined 306 second part of beamforming weights, the subset being a number of strongest beamforming weights for each user-layer signal corresponding to the strongest channel components or coefficients, and wherein the triggering sending 312 of the compressed second part of the beamforming weights implies sending the selected subset of the second part of the beamforming weights to the RRU. Often, the energy for one user-layer is more concentrated in some channel coefficients. For example, and especially, when the channel estimation is in the direction domain, such compression would be rather effective. A channel coefficient is a complex number, representing the channel attenuation and phase shift. In antenna element domain, it means the channel attenuation and phase shift from one transmit antenna to one receive antenna. In the direction domain, it means the channel attenuation and phase shift from one transmit direction, i.e. one transmit beam to one receive antenna. The directions are usually predefined by a number of directive beams pointing to different directions in the covered angles. Such beams can be obtained by using the DFT (Discrete Fourier Transform) base functions.

According to an alternative of this embodiment, the first part of the beamforming weights are determined 310 based on an effective channel estimate comprising the downlink channel estimate and the compressed second part of the beamforming weights. Hereby, the first part of beamforming weights can even mitigate the interferences caused by any inaccuracy due to compression of the second part of the beamforming weights.

According to another embodiment, the downlink channel estimate is determined 302 in antenna element domain. The method further comprises transforming 304 the downlink channel estimate from the antenna element domain to direction domain. Hereby, the spatial correlation can be better harnessed. Direction domain can also be called beam domain.

According to another embodiment, the second part of the beamforming weights are compressed 308 by using fewer bits for representing individual beamforming weights. It is possible to compress in this way as the second part of beamforming weights are not as sensitive to errors as the first part of the beamforming weights. Fewer bits for one beamforming weight may be using fewer quantization levels for describing one beamforming weight sample. Further, the second part of the beamforming weights may be represented by Block floating point or Block scaling, which have proven to be efficient quantization schemes with fewer bits.

According to another embodiment, the downlink channel estimate is determined 302 in a matrix format $\hat{H}$, further, the second part of the beamforming weights are determined 306 based on the Hermitian transpose $\hat{H}^H$ of the downlink channel estimate matrix $\hat{H}$.

According to another embodiment, the downlink channel estimate is determined 302 in a matrix format $\hat{H}$, Further, the first part of the beamforming weights are determined 310 based on the inverse of a matrix comprising the downlink channel estimate $\hat{H}$ and the Hermitian transpose $\hat{H}^H$ of the downlink channel estimate $\hat{H}$.

According to another embodiment, the method further comprises normalizing the first part of the beamforming weights according to a first-part scaling factor and the compressed second part of the beamforming weights according to a second-part scaling factor. The method further comprises triggering sending, to the RRU, information of the first-part and the second-part scaling factor. Further, the triggering sending 312 of the first part of the beamforming weights and the compressed second part of the beamforming weights to the RRU implies sending the normalized first part and the normalized compressed second part of the beamforming weights. Hereby, the dynamic range of the beamforming weights is reduced, which makes the quantization of the individual beamforming weights efficient. In other words, the beamforming weights can be efficiently and accurately described for sending over the fronthaul link. Also, the subsequent power allocation between user-layer signals may be controlled when they are to be sent from the RRU. The first-part scaling factor and the second-part scaling factor may be user-layer specific.

Figure 4:
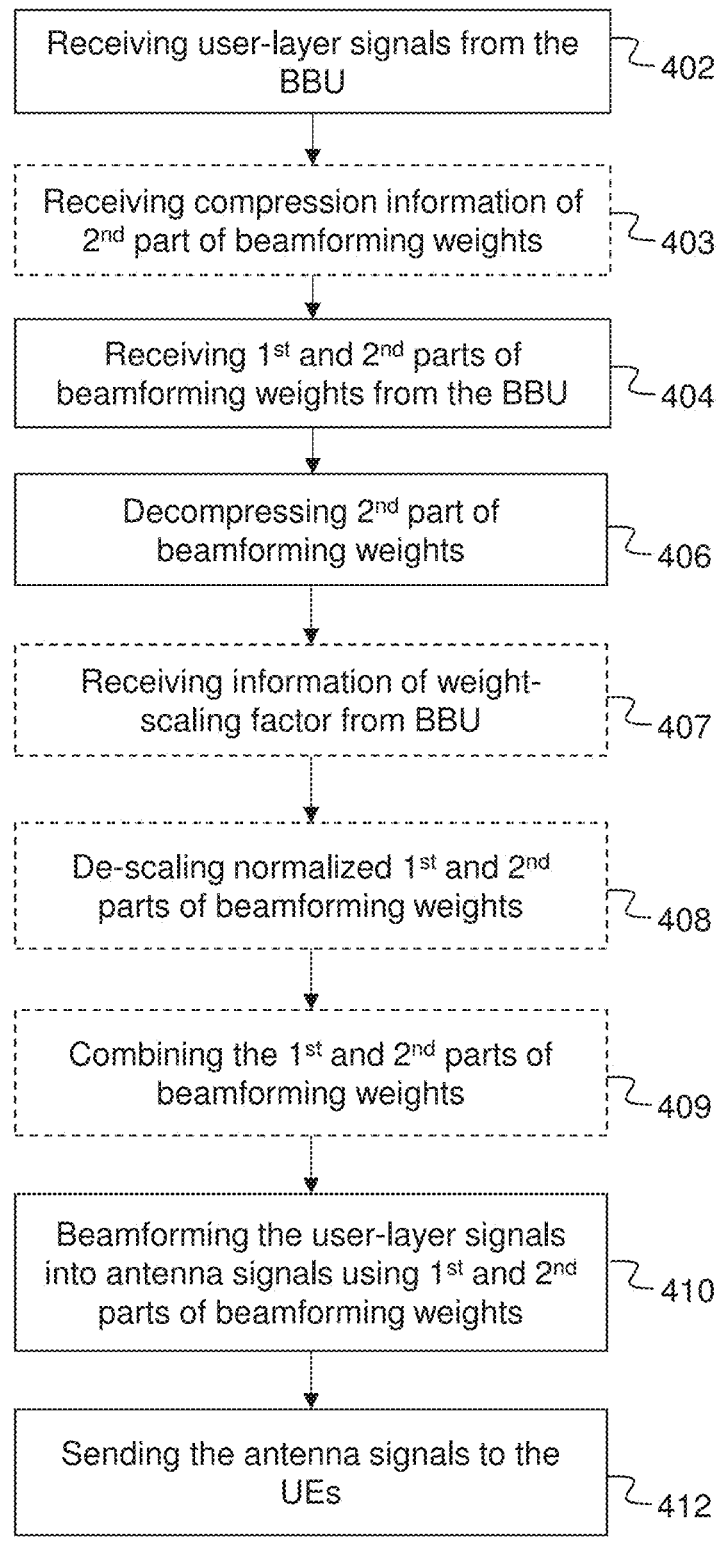
FIG. 4 is a flow chart illustrating a method performed by an RRU, according to possible embodiments.

FIG. 4, in conjunction with FIG. 1, describes a method performed by an RRU 120 of a distributed base station system 100. The RRU 120 is connected to N antennas 121, 122, 123. The distributed base station system 100 further comprises a BBU 110 connected to the RRU 120 over a fronthaul link 140. The method comprises receiving 402, from the BBU, K user-layer downlink signals to be sent to a number of UEs 131, 132, 133 wirelessly connected to the RRU, and receiving 404, from the BBU, a first part of beamforming weights and a compressed second part of beamforming weights for beamforming the K user-layer signals, the first and the second part of the beamforming weights being determined by the BBU from a downlink channel estimate. The method further comprises decompressing 406 the compressed second part of the beamforming weights, beamforming 410 the received K user-layer signals into antenna signals, using the first part and the decompressed second part of the beamforming weights, and sending 412 the antenna signals to the number of UEs via the N antennas 121, 122, 123. Further, the user-layer signals are beamformed 410 so that the first part of the beamforming weights are adapted for interference cancellation between the user-layer signals, and the second part of the beamforming weights are adapted for expanding the user-layer signals to antenna signals.

According to an embodiment, the method further comprises receiving 403, from the BBU, information of the compression of the second part of the beamforming weights. Further, the second part of the beamforming weights are decompressed 406 according to the received 403 information.

According to another embodiment, the method further comprises combining 409 the first part of the beamforming weights with the decompressed second part of the beamforming weights before the beamforming 410 of the received user-layer signals into antenna signals, using the first part and the decompressed second part of the beamforming weights.

According to another embodiment, the method further comprises transforming the combined 409 beamforming weights from direction domain to antenna element domain.

According to another embodiment, the received 404 first part of beamforming weights have been normalized according to a first-part scaling factor and the received compressed second part of beamforming weights have been normalized according to a second-part scaling factor. The method further comprises receiving 407, from the BBU, information of the first-part scaling factor and the second-part scaling factor, and de-scaling 408 the received normalized first part and the second part of the beamforming weights according to the information of the first-part scaling factor and the second-part scaling factor, before the beamforming 410.

According to embodiments of the invention, the estimation of the downlink channel is done in the BBU. Further, the beamforming weights (BFWs) are calculated in the BBU based on the downlink channel estimation and sent to the RRU, and the RRU performs beamforming based on the BFWs received from the BBU. Further, the BFWs P are decomposed into two parts as $P=P_2P_1$, where P represents the overall BFWs mathematically modeled as an N×K matrix, $P_1$ represents a first part of the BFWs mathematically modeled as a K×K matrix and $P_2$ represents a second part of the BFWs mathematically modeled as an N×K matrix. Further, $P_2$ are compressed. Then $P_2$ are sent together with $P_1$ from the BBU to the RRU, such that the total number of bits to represent $P_1$ and the compressed $P_2$ are fewer than the bits representing P. In a first embodiment, $P_2$ is compressed by selecting a subset of the original $P_2$, such that the total number of BFWs of $P_1$ and the compressed $P_2$ is smaller than N×K (N times K). In a second embodiment, $P_2$ is compressed by using fewer bits to represent individual BFWs in $P_2$. This can be done because $P_2$ is less sensitive to compression noise than $P_1$ and P. The first and the second embodiment can be used together. Nevertheless, the compressed $P_2$ can be interpreted as approximating the original $P_2$. According to a certain embodiment, to achieve even better performance, the compressed $P_2$ (i.e. the approximated $P_2$) is considered when calculating $P_1$. After receiving $P_1$ and the compressed $P_2$, the RRU first decompresses $P_2$ from the received compressed $P_2$. For example, in the first embodiment, the RRU sets zeros to the non-selected BFWs of $P_2$. Then the RRU calculates the overall beamforming weights as $P=P_2P_1$ and perform DL beamforming operations using P to the signals received from the BBU before the signals are transmitted wirelessly to the UEs they are intended for. An advantage of this invention is that the required FH capacity for transporting the BFWs are reduced. A further advantage is that the system is compliant to the O-RAN architecture.

In the following, an embodiment of the invention is described in which Zero-Forcing (ZF) based and/or Minimum Mean Square Error (MMSE) based methods for calculating BFWs are used as examples to mathematically explain the invention. Consider a scenario with K MIMO layers, aka user layers, in a desired cell. In MU-MIMO, these MIMO layers are usually intended for different UEs. The wireless communication channel H for a group of subcarriers from the RRU to the target UEs in the DL direction is mathematically modeled as a K×N matrix H∈ $\mathbb{C}^{K \times N}$ where N is the number of antennas of the RRU. Let P∈ $\mathbb{C}^{N \times K}$ denote the matrix representation of the DL beamforming weights to expand the signals of K MIMO layers to N antennas, which also pre-cancels the interferences between user-layers. At each antenna, the transmitted signal is a linear combination of the K MIMO layer signals with their corresponding BFWs. Mathematically, an ideal ZF-based beamforming weights can be expressed as $$P = \underbrace{H^H}_{P_2} \underbrace{(HH^H)^{-1}}_{P_1}.$$

where $H^H$ denotes the Hermitian transpose of H. For an MMSE-based method, the beamforming weights can be expressed as $$P = \underbrace{H^H}_{P_2}\underbrace{(HH^H + \sigma^2 I)^{-1}}_{P_1}.$$

where $\sigma^2$ is a measure of noise (or error terms) and I is a K×K identity matrix. As also shown from the equations above, in both cases, P can be decomposed into two parts as $P=P_2 P_1$, where $P_1$ represents the first part of the BFWs in a matrix format and $P_2$ represents the second part of the BFWs in a matrix format. The BBU estimates the desired wireless communication channel H as $\hat{H}$ and calculates $P_1$ and $P_2$, accordingly.

The first-part of the BFWs $P_1$, which when used on the MIMO layer signals perform interference pre-cancellation between the MIMO layer signals, is composed of K×K complex values. For the ZF method $P_1=(\hat{H}\hat{H}^H)^{-1}$. For the MMSE-based beamforming, $P_1=(\hat{H}\hat{H}^H+\sigma^2 I)^{-1}$.

For both ZF and MMSE based methods, the second-part of the BFWs $P_2=\hat{H}^H$, which when used on the MIMO layer signals expand from layer signals to antenna signals, which can be interpreted as applying a maximum-ratio transmission (MRT) for each user layer signal at each antenna with respect to its channel estimation.

Note that the invention is not limited to the examples of ZF and MMSE. Further, the second part of the BFWs, $P_2$, do not have to be an N×K matrix. $P_2$ may also be an N×M matrix, where K≤M<N, while the corresponding $P_1$ is an M×K matrix. The BFWs may be based on any other beamforming algorithms, e.g. MMSE-Interference Rejection Combining (MMSE-IRC).

For the Category-B RRUs defined in O-RAN, the BFWs need to be transported from the BBU to the RRU, since channel estimation is only available in the BBU. The BFWs in P are composed of N×K complex values. Comparing to the prior art which sends P to the RRU, here it is proposed to send $P_1$ and $P_2$ separately, and with $P_2$ significantly compressed. As a result, the total number of bits representing the totally required FH capacity for carrying the BFWs are reduced. In the following, two methods for compressing $P_2$ are presented. The two methods can be applied simultaneously.

In the first method, $P_2$ is compressed by selecting a subset of the weights. As mentioned above, in the above example with ZF and MMSE based methods, the second part of the BFWs $P_2$ are based on the Hermitian transpose of the DL channel estimation. The idea is to select only a subset of $P_2$ with a number of strongest weights in each column vector of $P_2$, which correspond to the number of strongest channel coefficients for one user layer, and will capture most of the channel energy for that user layer. Therefore, this kind of selection is referred to as a layer-specific selection. If the channel energy is more concentrated in some channel coefficients, for example, if the channel is perceived in direction domain, the compression would be more effective.

Recall that the channel estimation of channel H is denoted as $\hat{H}$. For each row k of $\hat{H}$, $R_k$ coefficients indexed by $U_k$ are selected, where $U_k$ is a set of $R_k$ unique indices ranging from 1 to N. The selection of indices in $U_k$ for row k fulfills at least two criteria:

1) The number of selected coefficients, $R_k$, is larger than or equal to the number of total user layers, K. This criterion guarantees that the covariance of the punctured channel estimation is well-conditioned for matrix inversion, which will be used for calculating the first part of the BFWs in $P_1$.

2) The selected coefficients of row k in the estimated channel $\hat{H}$ should contain most energy of that row, for example, by selecting the $R_k$ coefficients with the largest power values. This criterion makes sure that the system captures enough energy for each user layer.

After the selection, an approximated channel estimation $\hat{H}_a \in \mathbb{C}^{K \times N}$ is constructed, in which for any row k the coefficients indexed by $U_k$ equal to the coefficients indexed by $U_k$ in row k of $\hat{H}$ and the rest of the coefficients are set to zeros. Then $P_2$ are thereby determined as the Hermitian transpose of the approximated channel estimation, i.e. $P_2=\hat{H}_a^H$. Accordingly, $P_1=(\hat{H}\hat{H}_a^H)^{-1}$ for ZF-based beamforming and $P_1=(\hat{H}\hat{H}_a^H+\sigma^2 I)^{-1}$ for MMSE-based beamforming.

In massive MIMO, to improve the channel estimation, an additional step could be taken to transform the channel estimation $\hat{H}$ into direction/beam domain (hereinafter called direction-domain) for better harnessing the spatial correlation. Due to the fact that the channel the signal goes through towards a certain UE is typically concentrated in a certain direction while leaving the other directions less occupied, the channel represented in direction domain typically has the energy concentrated in a limited number of coefficients, the number of which is much smaller than K×N. In direction domain, there will be parallel non-overlapped beams pointing to different directions, and at each direction there is a certain beam gain. The beam gain can increase significantly the channel estimation SINR (Signal-to-Interference-and-Noise Ratio) in those energy-concentrated directions, which can achieve more accurate channel estimates than doing it in the element domain. Leveraging this property, the second part of BFWs in $P_2$ can be compresses more by selecting the ones corresponding to the strongest channel coefficients in the direction-domain channel.

In the direction-domain implementation, the BFWs are calculated in the BBU based on channel estimation in direction domain. Generally, the downlink wireless channel H can be expressed in direction domain as $H_d=HF^*$, where F denotes the direction-domain transformation basis matrix and $F^*$ denotes the complex conjugate of matrix F. One example of matrix F can be a Digital Fourier Transform (DFT) matrix. Let $\hat{H}_d$ specifically denote the channel estimation of the direction-domain channel $H_d$. Based on the process described as above, an approximated direction-domain channel estimation $\hat{H}_{da}$ is constructed by selecting the strongest $R_k$ coefficients on each row k and setting the rest of the coefficients to zeros. Then the beamforming coefficients $P_2$ are thereby determined as the Hermitian transpose of the approximated directional channel estimation, i.e. $P_2=\hat{H}_{da}^H$. Accordingly, $P_1=(\hat{H}_d\hat{H}_{da}^H)^{-1}$ for ZF-based beamforming and $P_1=(\hat{H}_d\hat{H}_{da}^H+\sigma^2 I)^{-1}$ for MMSE-based beamforming.

When the downlink channel, e.g. in element-domain or direction domain, is approximated by $\hat{H}_a$ or $\hat{H}_{da}$ as described above, $P_2$ becomes a sparse matrix, i.e., with many zero coefficients. This means that it can be effectively compressed before sending only the non-zero coefficients to the RRU. One implementation of this is to send not only the $\Sigma_{k=1}^{K} R_k$ non-zero coefficients in $P_2$ but also an N×K bitmap with zeroes (0) and ones (1) providing the corresponding information of the non-zero coefficient indices of each row in $P_2$. For example, "1" in the bit-map can mark the indices of corresponding non-zero coefficients. With the non-zero coefficients and the bitmap, the RRU can reconstruct, aka decompress $P_2$.

One numerical example showing the advantage in sending $P_1$ and $P_2$ separately as described above instead of $P=P_2P_1$ is as follows: Assume that the number of antennas at the RRU is N=64, the number of user layer signals is K=16, the number of selected coefficients for each user layer is R=16 and each complex coefficient is coded with 16 bits. In this case, sending P would need (64×16)×16=16384 bits per group of subcarriers, e.g. per RB or per group of RBs. On the other hand, sending $P_1$ would need (16×16)×16=4096 bits and sending $P_2$ would need $$\underbrace{(16 \times 16) \times 16}_{Non-zero\ values} + \underbrace{(64 \times 16) \times 1}_{bitmap} = 5120\ bits,$$

i.e. in total 9216 bits per group of subcarriers, e.g., per RB or per a group of RBs. As a result, by sending $P_1$ and $P_2$ as determined above would reduce the FH traffic load for sending the beamforming weights with 56% compared to the original case of sending P directly. In addition, using $P_2$ based on the approximated channel estimation $\hat{H}_a$ may improve the performance when the directions with large channel estimation errors can be excluded in the process of coefficients selection.

In the second method, $P_2$ is compressed by using fewer bits for representing individual BFWs of $P_2$, for example, each BFW can be represented by 7 bits instead of 8 bits. Further, some smaller BFWs corresponding to the weaker channel coefficients can be further compressed to 6 bits. It is difficult to compress individual BFWs of P directly with fewer bits. The reason is that P precancels the interferences between user layer signals, which involves an inversion operation of the channel estimation matrix $\hat{H}$ mathematically. The inversion of the channel estimation matrix needs to be calculated very accurately. Otherwise, the interferences are not fully cancelled. The residual interferences can significantly degrade the performance. Therefore, the pre-cancellation performance is very sensitive to the accuracy of P. This limits the possibility to reduce the number of bits of the BFWs in P. In embodiments of this invention, as mentioned before, P is split to $P_1$ and $P_2$, where $P_1$ determines the interference cancellation performance and $P_2$ expands user layer signals to antenna signals, which does not involve matrix inversion operation. For the same reason as explained for P, it is difficult to compress the BFWs in $P_1$ with fewer bits. However, $P_2$ can afford accuracy loss with higher compression. The accuracy loss is more related to capturing less channel energy, which is not as sensitive to $P_1$ and P.

In addition, the BFWs of $P_2$ can be grouped into multiple groups, in each of which the BFWs are represented with a specific number of bits. And the grouping information should be also sent to the RRU in order for the RRU to be able to decompress $P_2$. In some sense, the first method, based on BFW selection can be seen as a special case of the second method where the BFWs are grouped in two groups, in which the first group comprises of the selected BFWs and the unselected BFWs in the second group are coded by 0 bits.

Figure 5:
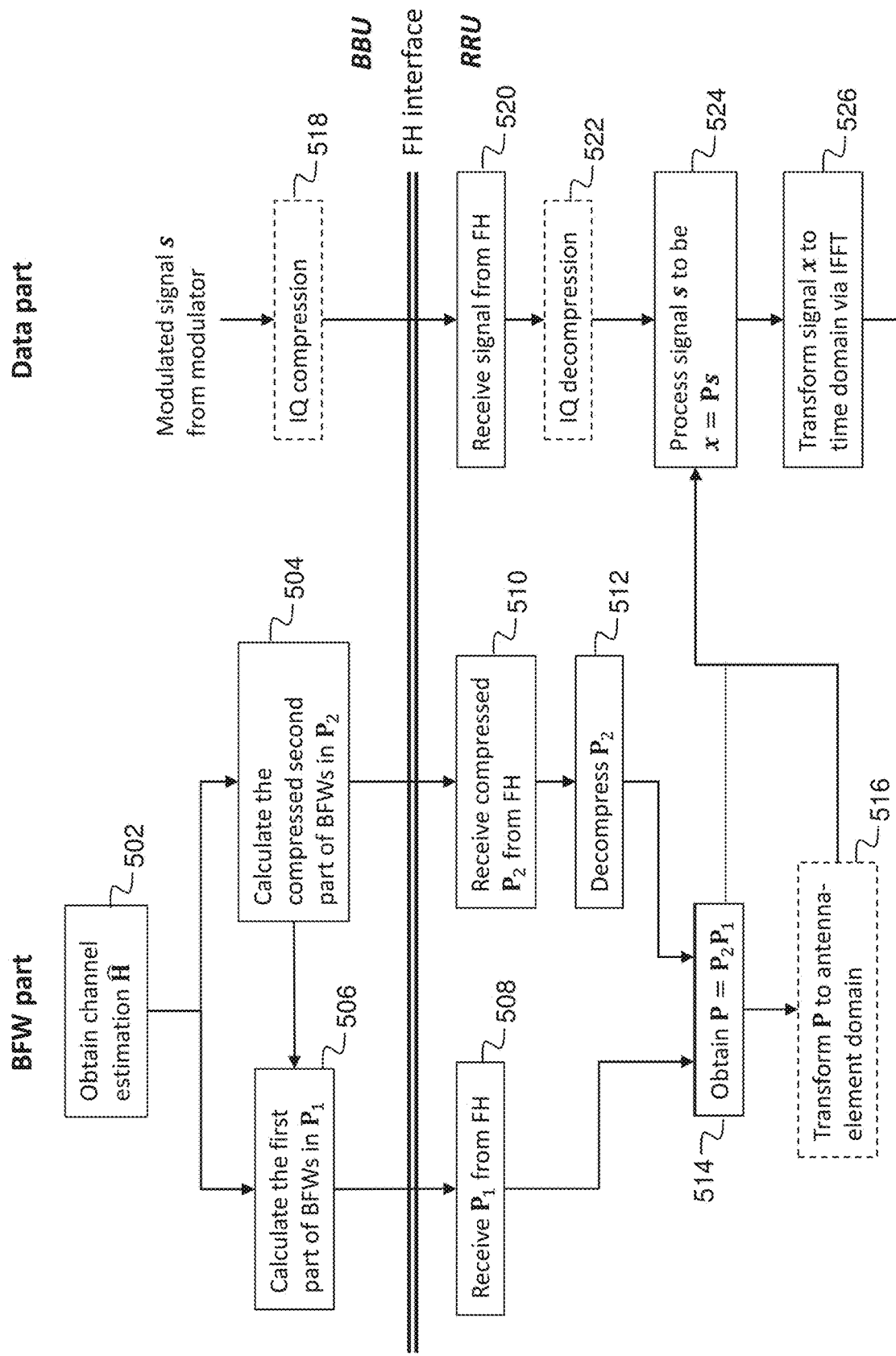
FIG. 5 is a flow chart illustrating another method performed by a distributed base station system, according to possible embodiments.

FIG. 5 shows a method according to an embodiment of the invention. The boxes above the fronthaul interface (FH interface) signify steps performed by the BBU, whereas the boxes below the FH interface signify steps performed by the RRU. The right part of FIG. 5, called "data part" deals with the handling of the downlink user layer signals s, whereas the left part, called "BFW part" deals with the handling and determination of beamforming weights. The downlink user layer signals s to be sent from the BBU over the FH interface, aka link, to the RRU are denoted $s=[s_1, s_2, \ldots, s_k, \ldots, s_K]^T$, where $[s_1, s_2, \ldots, s_K]^T$ is the transpose of vector $[s_1, s_2, \ldots, s_K]$ and $s_k$ is carried by the k-th FH stream. At the BBU, the downlink user layer signals, aka IQ signals, may be compressed 518 before being sent over the FH interface. In case they are compressed, the RRU decompresses 522 the IQ signals after it has received 520 them from the BBU. This example of data part follows the split used in O-RAN. Other splits can be also supported. For example, the BBU can send the coded bits and the RRU modulates the received coded bits to the modulated signals.

Before the downlink user layer signals are sent, the BBU obtains 502 a channel estimation $\hat{H}$ of the wireless communication channel between the RRU and the UEs, based on e.g. known uplink signals, such as reference signals, sent from the UEs to the RRU. This channel estimation can be in element domain or direction domain or in any other domain. The BBU then calculates 504 the compressed second part of BFWs $P_2$ such that the total number of bits to represent the first part of the BFWs $P_1$ and the compressed $P_2$ are fewer than the number of bits representing the original beamforming weights $P=P_2P_1$. According to an embodiment discussed earlier, $P_2$ is constructed according to the approximated channel estimation $\hat{H}_a$ as $P_2=\hat{H}_a^H$ where $\hat{H}_a$ is a punctured version of $\hat{H}$. The BBU further calculates 506 the first part of the BFWs $P_1$. $P_1$ may be constructed according to the compressed $P_2$. For example, the used $\hat{H}_a$ for constructing $P_2$ may also be used for constructing $P_1$. The first part of the BFWs $P_1$ are supposed to pre-cancel the interferences in an effective channel composing of $HP_2$, where the second part of the BFWs $P_2$ are obtained after compression, as described earlier.

The BBU then transmits $P_1$ and $P_2$ separately to the RRU. Likewise, the RRU receives 508 $P_1$ and receives 510 $P_2$ separately from the FH interface. The RRU then decompresses 512 and reconstructs $P_2$. According to an embodiment, if $P_2$ is provided in two parts, such as one matrix with $\Sigma_{k=1}^{K} R_k$ complex numbers and one N×K bit map, the RRU reconstructs $P_2$ as an N×K matrix with the information provided by the two parts. The RRU then obtains 514 the overall BFWs as in $P=P_2P_1$. If the BFWs are not calculated in antenna-element domain, the RRU further transforms 516, the BFWs into antenna-element domain. The RRU then performs the actual beamforming of the downlink user-layer signals into antenna signals using the overall BFWs. In other words, the downlink user layer signals s are processed 524 into antenna signals x=Ps. Further, the antenna signals x are transformed 526 from frequency domain to time domain via inverse Fast Fourier transform (IFFT), before they are sent wirelessly from each respective antenna towards the UEs.

In the following, power allocation between MIMO (user) layers is discussed. Once the BFWs have been calculated, it may be required to adjust the power over the number of co-scheduled UEs or MIMO layers in order to allocate power to every UE or MIMO layers. Let D denote a K×K diagonal matrix where each diagonal element represents a power-allocation factor with respect to the BFWs P, which not only may be used to control the power allocation among MIMO layers but also to reduce the dynamic range of BFWs facilitating quantization with fewer bits. In this case, the transmit signal at the RRU becomes $$x=PDs$$

In another aspect of this invention, the two parts of BFWs in $P_1$ and $P_2$ sent respectively from BBU to RRU need to be somewhat normalized as well so that the dynamic range of the BFWs represented by $P_1$ and $P_2$ is reduced. To achieve the same transmit signal x as expressed above, normalized first part and second part of the BFWs can be composed as $$\overline{P}_1 = D_2^{-1} P_1 D_1$$

$$\overline{P}_2 = P_2 D_2$$

where $D_1$ is a K×K diagonal matrix where each diagonal element represents a power-normalization factor with respect to each column of $D_2^{-1} P_1$, and $D_2$ is a K×K diagonal matrix where each diagonal element represents a power-normalization factor with respect to each column of $P_2$. In order to reconstruct the transmit signal x, the BBU needs to send the RRU the coefficients in $$\overline{D} = D_1^{-1} D$$

where $\overline{D}$ is a diagonal matrix containing K real values. Upon receiving $\overline{P}_1$, $\overline{P}_2$, and $\overline{D}$, the RRU can perform $$\overline{P}_2 \overline{P}_1 \overline{D}s = P_2 D_2 D_2^{-1} P_1 D_1 D_1^{-1} Ds = P_2 P_1 Ds = PDs = x$$

resulting in the desired transmit signal x originally intended.

Figure 6:
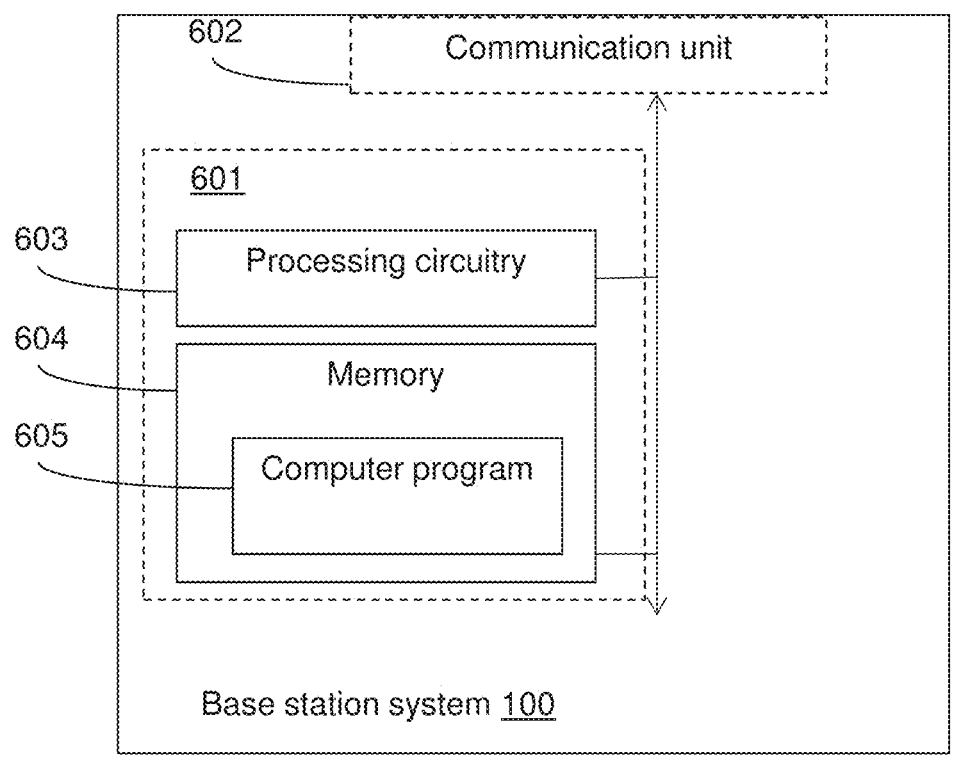
FIG. 6 is a schematic block diagram illustrating a distributed base station system in more detail, according to further possible embodiments.

FIG. 6, in conjunction with FIG. 1, describes a distributed base station system 100 operable in a wireless communication network. The distributed base station system 100 comprises a BBU 110 and an RRU 120 connected to each other over a fronthaul link 140. The RRU 120 is connected to N antennas 121, 122, 123. The distributed base station system 100 comprises a processing circuitry 603 and a memory 604, said memory containing instructions executable by said processing circuitry, whereby the distributed base station system 100 is operative for determining, by the BBU, a second part of beamforming weights based on a determined downlink channel estimate and compressing, by the BBU, the second part of the beamforming weights. The distributed base station system 100 is further operative for determining, by the BBU, a first part of the beamforming weights based on the determined downlink channel estimate. The first and the second part of the beamforming weights are to be used for beamforming K user-layer downlink signals to be sent to a number of UEs 131, 132, 133 wirelessly connected to the RRU 120. The distributed base station system 100 is further operative for sending, by the BBU, the first part of the beamforming weights and the compressed second part of the beamforming weights to the RRU, and sending, by the BBU, the K user-layer signals to the RRU. The distributed base station system 100 is further operative for decompressing, by the RRU, the received compressed second part of the beamforming weights, beamforming, by the RRU, the received K user-layer signals into N antenna signals, using the first part and the decompressed second part of the beamforming weights and sending, by the RRU, the beamformed N antenna signals to the number of UEs via the N antennas 121, 122, 123. Further, the first part of the beamforming weights are determined for performing interference mitigation between the user-layer signals in the beamforming, and the second part of the beamforming weights are determined for expanding the user-layer signals to antenna signals in the beamforming.

According to other embodiments, the base station system 100 may further comprise a communication unit 602, which may be considered to comprise conventional means for wireless communication with the wireless communication devices 131, 132, 133, such as a transceiver for wireless transmission and reception of signals. The communication unit 602 may also comprise conventional means for communication with other radio access network nodes of the wireless communication network 100, and with the core network. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the base station system 100 to perform the steps described in any of the described embodiments of the radio access network node 140 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the base station system 100 has access via the communication unit 602. The computer program 605 may then be downloaded from the server into the memory 604.

Figure 7:
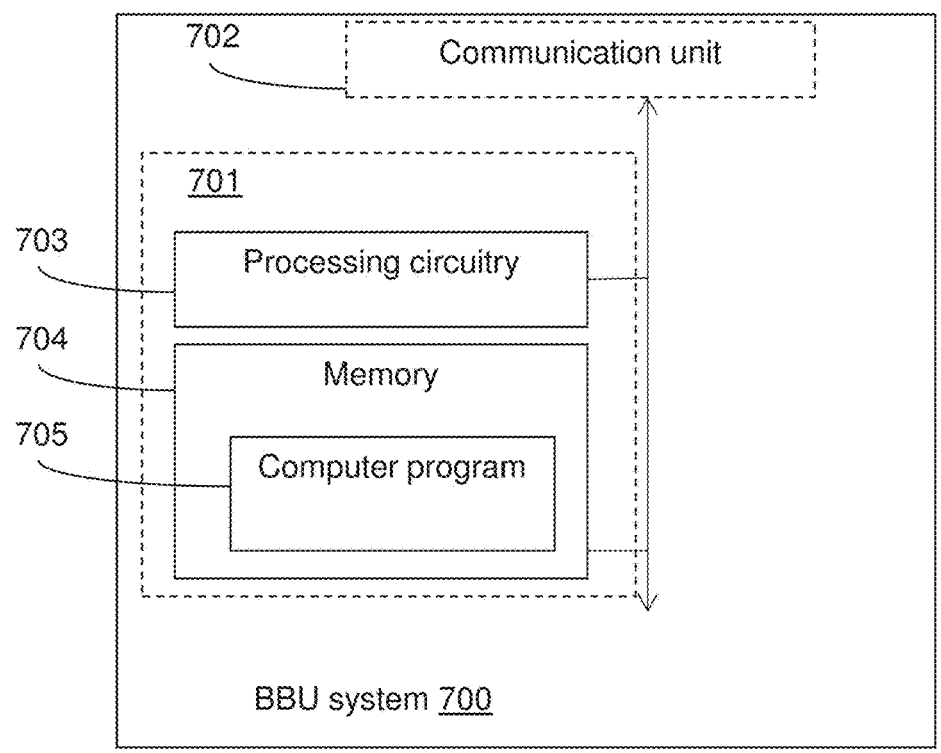
FIG. 7 is a schematic block diagram illustrating a BBU system in more detail, according to further possible embodiments.

FIG. 7, in conjunction with FIG. 1 shows a BBU system 700 operable in a wireless communication network. The wireless communication network comprises a distributed base station system 100 having a BBU 110 and an RRU 120 connected to the BBU over a fronthaul link 140. The RRU further has N antennas 121, 122, 123. The BBU system 700 comprises a processing circuitry 703 and a memory 704. Said memory contains instructions executable by said processing circuitry, whereby the BBU system 700 is operative for determining a second part of beamforming weights based on a determined downlink channel estimate, compressing the second part of the beamforming weights, and determining a first part of the beamforming weights based on the determined downlink channel estimate. The first and the second part of the beamforming weights are to be used for beamforming K user-layer downlink signals to be sent to a number of UEs 131, 132, 133 wirelessly connected to the RRU 120. The BBU system 700 is further operative for triggering sending the first part of the beamforming weights and the compressed second part of the beamforming weights to the RRU, and triggering sending the K user-layer signals to the RRU. Further, the first part of the beamforming weights are determined for performing interference cancellation between the user-layer signals, and the second part of the beamforming weights are determined for expanding the user-layer signals to antenna signals.

The BBU system 700 may be the actual BBU 110, or at least a part of the BBU 110. Alternatively, the BBU system may be any other network node of the wireless communication network, such as a node further away from the UE, e.g. another network element in the RAN or close to the RAN or another RAN node, or a core network node. In this alternative, the BBU 110 receives from the BBU system the first and second part of the BFWs determined by the BBU systems and transmits them to the RRU. Alternatively, the BBU system may be a group of network nodes, wherein BBU system functionality is spread out over different physical, or virtual, nodes of the network. The latter may be called a "cloud-solution".

According to an embodiment, the BBU system 700 is operative for compressing the second part of the beamforming weights by selecting only a subset of the determined second part of the beamforming weights, the subset being a number of strongest beamforming weights for each user-layer signal, and operative for triggering sending of the compressed second part of the beamforming weights by sending the selected subset of the second part of the beamforming weights to the RRU.

According to another embodiment, the BBU system 700 is further operative for determining the downlink channel estimate on received uplink signals originating from the number of UEs 131, 132, 133.

According to another embodiment, the BBU system 700 is operative for determining the first part of the beamforming weights based on an effective channel estimate comprising the downlink channel estimate and the compressed second part of the beamforming weights.

According to another embodiment, the BBU system 700 is further operative for determining the downlink channel estimate in antenna element domain, and transforming the downlink channel estimate from the antenna element domain to direction domain.

According to another embodiment, the BBU system 700 is operative for compressing the second part of the beamforming weights by using fewer bits for representing individual beamforming weights.

According to yet another embodiment, the BBU system 700 is operative for determining the downlink channel estimate in a matrix format A, and for determining the second part of the beamforming weights based on the Hermitian transpose $\hat{H}^H$ of the downlink channel estimate matrix $\hat{H}$.

According to another embodiment, the BBU system 700 is operative for determining the downlink channel estimate in a matrix format $\hat{H}$, and for determining the first part of the beamforming weights based on the inverse of a matrix comprising the downlink channel estimate $\hat{H}$ and the second part of the beamforming weights.

According to another embodiment, the BBU system 700 is further operative for normalizing the first part of the beamforming weights according to a first-part scaling factor and the compressed second part of the beamforming weights according to a second-part scaling factor, and for triggering sending, to the RRU, information of the first-part and the second-part scaling factor. Further, the BBU system is operative for the triggering sending of the first part of the beamforming weights and the compressed second part of the beamforming weights to the RRU by sending the normalized first part and the normalized compressed second part of the beamforming weights.

According to other embodiments, BBU system 700 may further comprise a communication unit 702, which may be considered to comprise conventional means for communication with other radio access network nodes of the wireless communication network 100 and with the RRU 120. The instructions executable by said processing circuitry 703 may be arranged as a computer program 705 stored e.g. in said memory 704. The processing circuitry 703 and the memory 704 may be arranged in a sub-arrangement 701. The sub-arrangement 701 may be a micro-processor and adequate software and storage therefore, a Programmable Logic Device, PLD, or other electronic component(s)/processing circuit(s) configured to perform the methods mentioned above. The processing circuitry 703 may comprise one or more programmable processor, application-specific integrated circuits, field programmable gate arrays or combinations of these adapted to execute instructions.

The computer program 705 may be arranged such that when its instructions are run in the processing circuitry, they cause the BBU system 700 to perform the steps described in any of the described embodiments of the BBU system 700 and its method. The computer program 705 may be carried by a computer program product connectable to the processing circuitry 703. The computer program product may be the memory 704, or at least arranged in the memory. The memory 704 may be realized as for example a RAM (Random-access memory), ROM (Read-Only Memory) or an EEPROM (Electrical Erasable Programmable ROM). Further, the computer program 705 may be carried by a separate computer-readable medium, such as a CD, DVD or flash memory, from which the program could be downloaded into the memory 704. Alternatively, the computer program may be stored on a server or any other entity to which the BBU system 700 has access via the communication unit 702. The computer program 705 may then be downloaded from the server into the memory 704.

Figure 8:
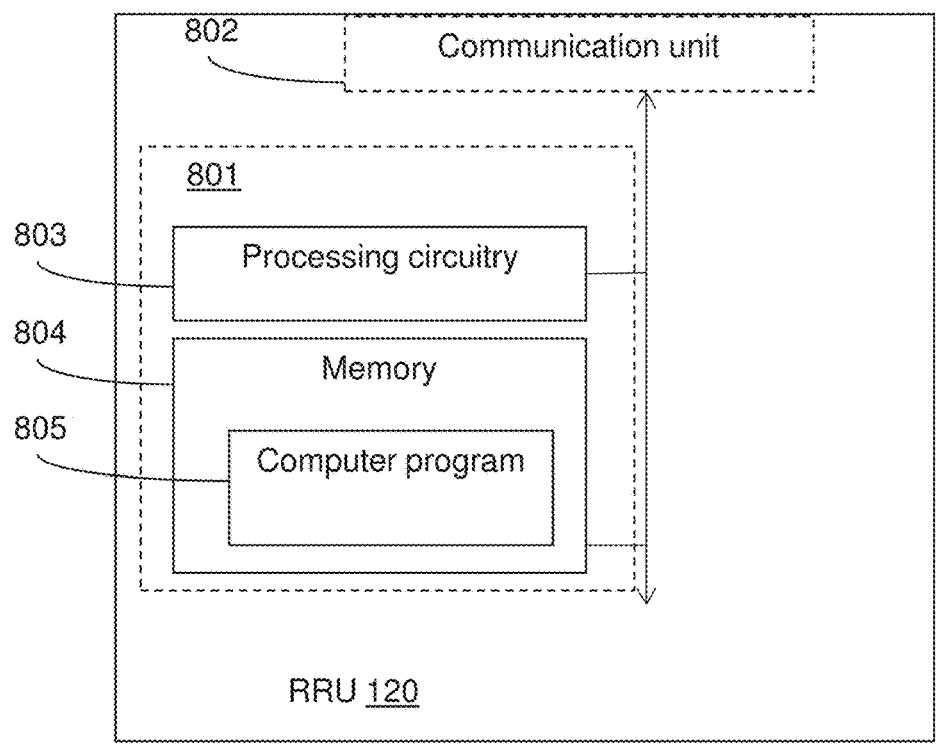
FIG. 8 is a schematic block diagram illustrating an RRU in more detail, according to further possible embodiments.

FIG. 8, in conjunction with FIG. 1 describes an RRU 120 operable in a distributed base station system 100 of a wireless communication network. The distributed base station system 100 further comprises a BBU 110 connected to the RRU over a fronthaul link 140. The RRU 120 is operable to be connected to N antennas 121, 122, 123. The RRU 120 comprises a processing circuitry 803 and a memory 804. Said memory contains instructions executable by said processing circuitry, whereby the RRU 120 is operative for receiving, from the BBU, K user-layer downlink signals to be sent to a number of UEs 131, 132, 133 wirelessly connected to the RRU, and receiving, from the BBU, a first part of beamforming weights and a compressed second part of beamforming weights for beamforming the K user-layer signals, the first and the second part of the beamforming weights being determined by the BBU from a downlink channel estimate. The RRU 120 is further operative for decompressing the compressed second part of the beamforming weights, beamforming the received K user-layer signals into antenna signals, using the first part and the decompressed second part of the beamforming weights, and sending the antenna signals to the number of UEs via the N antennas 121, 122, 123. The user-layer signals are beamformed so that the first part of the beamforming weights are adapted for interference cancellation between the user-layer signals, and the second part of the beamforming weights are adapted for expanding the user-layer signals to antenna signals.

According to an embodiment, the RRU 120 is further operative for receiving, from the BBU, information of the compression of the second part of the beamforming weights. Further, the RRU is operative for decompressing the second part of the beamforming weights according to the received information.

According to another embodiment, the RRU 120 is further operative for combining the first part of the beamforming weights with the decompressed second part of the beamforming weights before the beamforming of the received user-layer signals into antenna signals, using the first part and the decompressed second part of the beamforming weights.

According to another embodiment, the RRU 120 is further operative for transforming the combined beamforming weights from direction domain to antenna element domain.

According to another embodiment, the received first part of the beamforming weights are normalized according to a first-part scaling factor and the received compressed second part of the beamforming weights are normalized according to a second-part scaling factor. Further, the RRU is operative for receiving, from the BBU, information of the first-part scaling factor and the second-part scaling factor, and descaling the received normalized first part and second part of the beamforming weights according to the information of the first-part scaling factor and the second-part scaling factor, before the beamforming.

According to other embodiments, the RRU 120 may further comprise a communication unit 802, which may be considered to comprise conventional means for wireless communication with the wireless communication devices 131, 132, 133, such as a transceiver for wireless transmission and reception of signals. The instructions executable by said processing circuitry 803 may be arranged as a computer program 805 stored e.g. in said memory 804. The processing circuitry 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the methods mentioned above. The processing circuitry 803 may comprise one or more programmable processor, application-specific integrated circuits, field programmable gate arrays or combinations of these adapted to execute instructions.

The computer program 805 may be arranged such that when its instructions are run in the processing circuitry, they cause the RRU 120 to perform the steps described in any of the described embodiments of the RRU 120 and its method. The computer program 805 may be carried by a computer program product connectable to the processing circuitry 803. The computer program product may be the memory 804, or at least arranged in the memory. The memory 804 may be realized as for example a RAM (Random-access memory), ROM (Read-Only Memory) or an EEPROM (Electrical Erasable Programmable ROM). Further, the computer program 805 may be carried by a separate computer-readable medium, such as a CD, DVD or flash memory, from which the program could be downloaded into the memory 804. Alternatively, the computer program may be stored on a server or any other entity to which the RRU 120 has access via the communication unit 802. The computer program 805 may then be downloaded from the server into the memory 804.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a base band unit (BBU) of a wireless communication network; the wireless communication network comprising a distributed base station system comprising a BBU and a remote radio unit connected to the BBU over a fronthaul link, with the RRU being connected to N antennas; the method comprising:
    determining a second part of beamforming weights based on a determined downlink channel estimate;
    compressing the second part of the beamforming weights;
    determining a first part of the beamforming weights based on the determined downlink channel estimate; wherein the first and the second parts of the beamforming weights are to be used for beamforming K user-layer downlink signals to be sent to a number of User Equipments (UEs) wirelessly connected to the RRU;
    triggering sending the first part of the beamforming weights and the compressed second part of the beamforming weights to the RRU;
    triggering sending the K user-layer signals to the RRU;
    wherein the first part of the beamforming weights are determined for performing interference cancellation between the user-layer signals; wherein the second part of the beamforming weights are determined for expanding the user-layer signals to antenna signals.

2. The method of claim 1, further comprising determining the downlink channel estimate based on received uplink signals originating from the number of UEs.

3. The method of claim 1:
    wherein the second part of the beamforming weights are compressed by selecting only a subset of the determined second part of the beamforming weights, the subset being a number of strongest beamforming weights for each user-layer signal; and
    wherein the triggering sending of the compressed second part of the beamforming weights comprises triggering sending the selected subset of the second part of the beamforming weights to the RRU.

4. The method of claim 3, wherein the first part of the beamforming weights are determined based on an effective channel estimate comprising the downlink channel estimate and the compressed second part of the beamforming weights.

5. The method of claim 1:
    wherein the downlink channel estimate is determined in an antenna element domain;
    wherein the method further comprises transforming the downlink channel estimate from the antenna element domain to a direction domain.

6. The method of claim 1, further comprising:
    normalizing the first part of the beamforming weights according to a first-part scaling factor and the compressed second part of the beamforming weights according to a second-part scaling factor; and
    triggering sending, to the RRU, information of the first-part and the second-part scaling factor;
    wherein the triggering sending of the first part of the beamforming weights and the compressed second part of the beamforming weights to the RRU comprises triggering sending the normalized first part and the normalized compressed second part of the beamforming weights.

7. A method performed by a radio remote unit (RRU) of a distributed base station system; the RRU being connected to N antennas, the distributed base station system further comprising a base band unit (BBU) connected to the RRU over a fronthaul link; the method comprising:
receiving, from the BBU, K user-layer downlink signals to be sent to a number of User Equipments (UEs) wirelessly connected to the RRU;
receiving, from the BBU, a first part of beamforming weights and a compressed second part of beamforming weights for beamforming the K user-layer signals; the first and second parts of the beamforming weights being determined by the BBU from a downlink channel estimate;
decompressing the compressed second part of the beamforming weights;
beamforming the received K user-layer signals into antenna signals using the first part and the decompressed second part of the beamforming weights;
sending the antenna signals to the number of UEs via the N antennas;
wherein the user-layer signals are beamformed so that the first part of the beamforming weights are adapted for interference cancellation between the user-layer signals, and the second part of the beamforming weights are adapted for expanding the user-layer signals to antenna signals.

8. The method of claim 7:
further comprising receiving, from the BBU, information of the compression of the second part of the beamforming weights; and
wherein the second part of the beamforming weights are decompressed according to the received information.

9. The method of claim 7, further comprising combining the first part of the beamforming weights with the decompressed second part of the beamforming weights before the beamforming of the received user-layer signals into antenna signals.

10. The method of claim 9, further comprising transforming the combined beamforming weights from a direction domain to an antenna element domain.

11. The method of claim 7:
wherein the received first part of the beamforming weights are normalized according to a first-part scaling factor and the received compressed second part of the beamforming weights are normalized according to a second-part scaling factor;
wherein the method further comprises:
receiving, from the BBU, information of the first-part scaling factor and the second-part scaling factor; and
descaling the received normalized first part and second part of the beamforming weights according to the information of the first-part scaling factor and the second-part scaling factor, before the beamforming.

12. A base band unit (BBU) system operable in a wireless communication network; the wireless communication network comprising a distributed base station system having a BBU and a remote radio unit (RRU) connected to the BBU over a fronthaul link, with the RRU further having N antennas; the BBU system comprising:
processing circuitry;
memory containing instructions executable by the processing circuitry whereby the BBU is operative to:
determine a second part of beamforming weights based on a determined downlink channel estimate;
compress the second part of the beamforming weights;
determine a first part of the beamforming weights based on the determined downlink channel estimate; wherein the first and the second part of the beamforming weights are to be used for beamforming K user-layer downlink signals to be sent to a number of User Equipments (UEs) wirelessly connected to the RRU;
trigger sending the first part of the beamforming weights and the compressed second part of the beamforming weights to the RRU;
trigger sending the K user-layer signals to the RRU;
wherein the first part of the beamforming weights are determined for performing interference cancellation between the user-layer signals; wherein the second part of the beamforming weights are determined for expanding the user-layer signals to antenna signals.

13. The BBU system of claim 12, wherein the instructions are such that the BBU is operative to:
compress the second part of the beamforming weights by selecting only a subset of the determined second part of the beamforming weights, the subset being a number of strongest beamforming weights for each user-layer signal; and
trigger sending of the compressed second part of the beamforming weights by triggering sending the selected subset of the second part of the beamforming weights to the RRU.

14. The BBU system of claim 13, wherein the instructions are such that the BBU is operative to determine the first part of the beamforming weights based on an effective channel estimate comprising the downlink channel estimate and the compressed second part of the beamforming weights.

15. The BBU system of claim 12, wherein the instructions are such that the BBU is operative to:
determine the downlink channel estimate in an antenna element domain; and
transform the downlink channel estimate from the antenna element domain to a direction domain.

16. The BBU system of claim 12, wherein the instructions are such that the BBU is operative to:
normalize the first part of the beamforming weights according to a first-part scaling factor and the compressed second part of the beamforming weights according to a second-part scaling factor; and
trigger sending, to the RRU, information of the first-part and the second-part scaling factor;
trigger sending of the first part of the beamforming weights and the compressed second part of the beamforming weights to the RRU by sending the normalized first part and the normalized compressed second part of the beamforming weights.

17. A remote radio unit (RRU) operable in a distributed base station system of a wireless communication network; the distributed base station system further comprising a base band unit (BBU) connected to the RRU over a fronthaul link; the RRU being configured to be connected to N antennas; the RRU comprising:
processing circuitry;
memory containing instructions executable by the processing circuitry whereby the RRU is operative to:
receive, from the BBU, K user-layer downlink signals to be sent to a number of UEs wirelessly connected to the RRU;
receive, from the BBU, a first part of beamforming weights and a compressed second part of beamforming weights for beamforming the K user-layer signals, the first and the second part of the beamforming weights being determined by the BBU from a downlink channel estimate;

decompress the compressed second part of the beamforming weights;

beamform the received K user-layer signals into antenna signals using the first part and the decompressed second part of the beamforming weights;

send the antenna signals to the number of UEs via the N antennas;

wherein the user-layer signals are beamformed so that the first part of the beamforming weights are adapted for interference cancellation between the user-layer signals, and the second part of the beamforming weights are adapted for expanding the user-layer signals to antenna signals.

18. The RRU of claim 17, wherein the instructions are such that the RRU is operative to:

receive, from the BBU, information of the compression of the second part of the beamforming weights; and decompress the second part of the beamforming weights according to the received information.

19. The RRU of claim 17, wherein the instructions are such that the RRU is operative to combine the first part of the beamforming weights with the decompressed second part of the beamforming weights before the beamforming of the received user-layer signals into antenna signals.

20. The RRU of claim 17:

wherein the received first part of the beamforming weights are normalized according to a first-part scaling factor and the received compressed second part of the beamforming weights are normalized according to a second-part scaling factor;

wherein the instructions are such that the RRU is operative to:

receive, from the BBU, information of the first-part scaling factor and the second-part scaling factor; and descale the received normalized first part and second part of the beamforming weights according to the information of the first-part scaling factor and the second-part scaling factor, before the beamforming.

* * * * *